United States Patent
Xing et al.

(10) Patent No.: US 12,333,125 B2
(45) Date of Patent: Jun. 17, 2025

(54) METHOD, APPARATUS, DEVICE AND STORAGE MEDIUM FOR PAGE INTERACTION

(71) Applicant: Beijing Zitiao Network Technology Co., Ltd., Beijing (CN)

(72) Inventors: Jiancheng Xing, Beijing (CN); Xiaoshu Jin, Beijing (CN); Wenshu Zhang, Beijing (CN); Wenjun Zhong, Beijing (CN); Shaoming Chen, Beijing (CN); Qiming Lv, Beijing (CN); Qunfeng Luo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/807,396

(22) Filed: Aug. 16, 2024

(65) Prior Publication Data
US 2024/0402886 A1    Dec. 5, 2024

Related U.S. Application Data

(63) Continuation of application No. PCT/CN2023/082331, filed on Mar. 17, 2023.

(30) Foreign Application Priority Data

Apr. 6, 2022    (CN) .......................... 202210373675.5

(51) Int. Cl.
*G06F 3/0483* (2013.01)
*G06F 3/04842* (2022.01)
(Continued)

(52) U.S. Cl.
CPC ........ *G06F 3/0483* (2013.01); *G06F 3/04842* (2013.01); *G06F 3/0488* (2013.01); *G06F 3/04817* (2013.01)

(58) Field of Classification Search
None
See application file for complete search history.

(56) References Cited

U.S. PATENT DOCUMENTS

| | | | |
|---|---|---|---|
| 2009/0100380 A1 | 4/2009 | Gardner et al. | |
| 2012/0083260 A1* | 4/2012 | Arriola | ................ G06F 16/252 |
| | | | 455/418 |

(Continued)

FOREIGN PATENT DOCUMENTS

| | | |
|---|---|---|
| CN | 103324403 A | 9/2013 |
| CN | 104679434 A | 6/2015 |

(Continued)

OTHER PUBLICATIONS

China National Intellectual Property Administration, Office Action and Search Report Issued in Application No. 202210373675.5, Mar. 14, 2024, 34 pages.

(Continued)

*Primary Examiner* — Tuyetlien T Tran
(74) *Attorney, Agent, or Firm* — Alleman Hall & Tuttle LLP

(57) ABSTRACT

According to embodiments of the present disclosure, a method, an apparatus, a device, and a storage medium for page interaction are provided. The method includes presenting a predetermined icon at a predetermined location in a first page, the predetermined icon configured for accessing a second page; detecting a non-tap gesture on a first page; if the non-tap gesture is detected, based on the type of the non-tap gesture and a location corresponding to the first page in a page navigation structure, determining whether the non-tap gesture corresponds to the selection of a predetermined icon; and switching from the first page to the second page if the non-tap gesture is determined to correspond to the selection of the predetermined icon. In this way, (Continued)

convenient, quick switching and access to the pages may be supported.

19 Claims, 11 Drawing Sheets

(51) Int. Cl.
    *G06F 3/0488*     (2022.01)
    *G06F 3/04817*    (2022.01)

(56) References Cited

U.S. PATENT DOCUMENTS

| | | | |
|---|---|---|---|
| 2013/0139095 A1* | 5/2013 | Li | G06F 3/1454 715/778 |
| 2013/0145290 A1* | 6/2013 | Weber | G06F 3/0483 715/760 |
| 2014/0068424 A1 | 3/2014 | Dhanani et al. | |
| 2014/0075368 A1* | 3/2014 | Kim | G06F 3/0483 715/776 |
| 2014/0075527 A1* | 3/2014 | Kim | H04L 63/105 726/7 |
| 2014/0282151 A1* | 9/2014 | Harvey | G06F 3/0488 715/765 |
| 2014/0340299 A1* | 11/2014 | Lee | G06F 3/147 345/156 |
| 2016/0041713 A1* | 2/2016 | Kim | G06F 3/0483 715/776 |
| 2016/0294806 A1* | 10/2016 | Du | H04L 63/08 |
| 2017/0123625 A1* | 5/2017 | Gao | G06F 3/0481 |
| 2019/0073094 A1* | 3/2019 | Lu | G06F 3/0484 |
| 2019/0073101 A1* | 3/2019 | Li | G06F 3/0483 |
| 2020/0366963 A1* | 11/2020 | Liao | H04N 21/4312 |
| 2021/0127171 A1* | 4/2021 | Liu | G06F 3/0488 |
| 2021/0311555 A1* | 10/2021 | Li | G06N 20/00 |
| 2021/0342044 A1* | 11/2021 | Xu | G06F 3/04883 |
| 2021/0405828 A1* | 12/2021 | Jiang | G06Q 30/0633 |
| 2021/0409354 A1* | 12/2021 | Jang | H04L 51/18 |
| 2022/0057932 A1* | 2/2022 | Kim | G06F 3/0482 |
| 2022/0058037 A1 | 2/2022 | Ye et al. | |
| 2022/0236844 A1* | 7/2022 | Luo | G06F 9/451 |
| 2022/0239985 A1* | 7/2022 | Kou | G06F 3/0482 |
| 2023/0004268 A1* | 1/2023 | Jiao | G06F 3/04883 |
| 2023/0124461 A1* | 4/2023 | Lin | H04N 21/4312 715/708 |

FOREIGN PATENT DOCUMENTS

| | | |
|---|---|---|
| CN | 105335224 A | 2/2016 |
| CN | 105843491 A | 8/2016 |
| CN | 106371901 A | 2/2017 |
| CN | 107562322 A | 1/2018 |
| CN | 108108113 A | 6/2018 |
| CN | 104077183 B | 7/2018 |
| CN | 111580718 A | 8/2020 |
| CN | 111625167 A | 9/2020 |
| CN | 112130729 A | 12/2020 |
| CN | 112181253 A | 1/2021 |
| CN | 107391008 B | 6/2021 |
| CN | 113268299 A | 8/2021 |
| CN | 113420243 A | 9/2021 |
| CN | 113835585 A | 12/2021 |
| CN | 114756778 A | 7/2022 |
| JP | 2015172861 A | 10/2015 |
| JP | 2020187718 A | 11/2020 |
| WO | 2019051673 A1 | 3/2019 |

OTHER PUBLICATIONS

China National Intellectual Property Administration, Office Action and Search Report Issued in Application No. 202210373675.5, May 24, 2024, 32 pages.
ISA China National Intellectual Property Administration, International Search Report Issued in Application No. PCT/CN2023/082331, Jun. 16, 2023, 7 pages.
China National Intellectual Property Administration, Rejection Decision for Chinese Application No. 202210373675.5, mailed Oct. 22, 2024, 16 pages.
Notice of Reasons for Refusal for Japanese Application No. 2024-547740, mailed Mar. 25, 2025, 10 pages.
European Patent Office, Extended European Search Report Issued in Application No. 23784154.9, Apr. 15, 2025, Germany, 8 pages.

* cited by examiner

METHOD, APPARATUS, DEVICE AND STORAGE MEDIUM FOR PAGE INTERACTION

CROSS-REFERENCE

The present application is a continuation of International Patent Application No. PCT/CN2023/082331, filed on Mar. 17, 2023, which claims priority to Chinese Patent Application No. 202210373675.5, filed on Apr. 6, 2022, entitled "METHOD, APPARATUS, DEVICE AND STORAGE MEDIUM FOR PAGE INTERACTION", both of which are incorporated herein by reference in their entireties.

FIELD

Example embodiments of the present disclosure generally relate to the field of computers, and, more particularly, to a method, an apparatus, a device and a computer-readable storage medium for page interaction.

BACKGROUND

More and more applications are currently designed to provide a user with various services. The user may perform various operations on the applications. For example, the user can create and post various types of content in content sharing applications, including multimedia content such as a video, an image, a set of images, a sound, etc. In addition, the user may also perform various operations in the application such as browsing, commenting, forwarding and messaging and/or the like. Some operations in the application may need to be performed on a specific page. It is important to make it easy to jump to some pages of the application, for example, the pages that are frequently visited by the user.

SUMMARY

According to example embodiments of the present disclosure, a solution for page interaction is provided to facilitate convenient access to a specific page by a user.

In a first aspect of the present disclosure, a method of page interaction is provided. The method comprises: presenting a predetermined icon at a predetermined position in a first page; detecting a non-tap gesture on the first page; in response to the non-tap gesture being detected, based on a type of the non-tap gesture and a location corresponding to the first page in a page navigation structure, determining whether the non-tap gesture corresponds to a selection of the pre-determined icon; and in response to determining that the non-tap gesture corresponds to the selection of the predetermined icon, switching from the first page to the second page.

In a second aspect of the present disclosure, an apparatus for page interaction is provided. The apparatus comprises an icon presentation module, configured to present a predetermined icon at a predetermined location in a first page; a gesture detection module, configured to detect a non-tap gesture on the first page; an icon selection determination module, configured to determine, in response to the non-tap gesture being detected, whether the non-tap gesture corresponds to a selection of the predetermined icon, based on a type of the non-tap gesture and a location corresponding to the first page in a page navigation structure; and a page rendering module, configured to, in response to determining that the non-tap gesture corresponding to a selection of the predetermined icon, switch from the first page to a second page.

In a third aspect of the present disclosure, an electronic device is provided. The device comprises at least one processing unit; and at least one memory coupled to the at least one processing unit and storing instructions for execution by the at least one processing unit. The instructions, when executed by the at least one processing unit, cause the device to perform the method of the first aspect.

In a fourth aspect of the present disclosure, a computer readable storage medium is provided. The computer readable storage medium, having a computer program stored thereon which, when executed by a processor, implements the method of the first aspect.

It would be appreciated that the content described in the summary is neither intended to identify the key features or essential features of the embodiments of the present disclosure, nor is it intended to limit the scope of the present disclosure. Other features of the present disclosure will be readily understood through the following description.

BRIEF DESCRIPTION OF THE DRAWINGS

The above and other features, advantages, and aspects of the various embodiments of the present disclosure will become more apparent in combination with the accompanying drawings and with reference to the following detailed description. In the drawings, the same or similar reference symbols refer to the same or similar elements, wherein.

DETAILED DESCRIPTION

Figure 1:
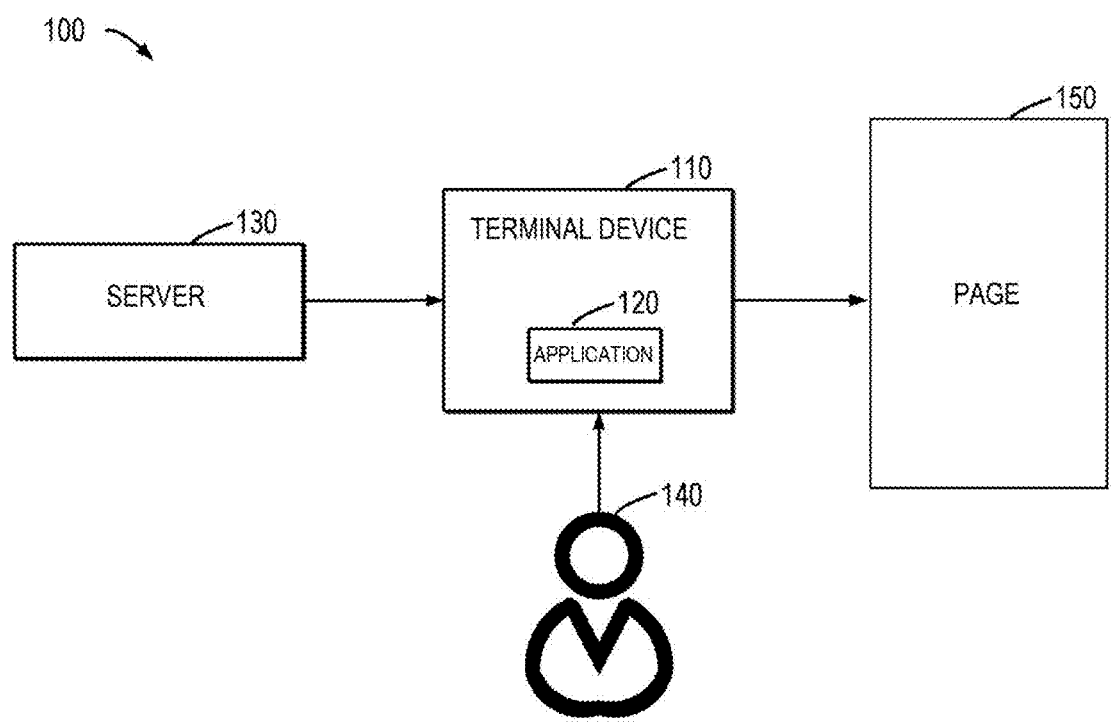
FIG. 1 shows a schematic diagram of an example environment in which embodiments of the present disclosure can be implemented.

The embodiments of the present disclosure will be described in more detail below with reference to the accompanying drawings. Although certain embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the accompanying drawings and embodiments of the present disclosure are only for the purpose of illustration and are not intended to limit the scope of protection of the present disclosure.

In the description of the embodiments of the present disclosure, the term "comprising", and similar terms would be appreciated as open inclusion, that is, "comprising but not limited to". The term "based on" would be appreciated as "at least partially based on". The term "one embodiment" or "the embodiment" would be appreciated as "at least one embodiment". The term "some embodiments" would be appreciated as "at least some embodiments". Other explicit and implicit definitions may also be included below.

FIG. 1 shows a schematic diagram of an example environment 100 in which embodiments of the present disclosure can be implemented. In this example environment 100, an application 120 is installed in a terminal device 110. The user 140 may interact with the application 120 via the terminal device 110 and/or an attachment device of the terminal device 110. The application 120 may be a content sharing application capable of providing the user 140 with services related to multimedia content consumption, including browsing, commenting, forwarding, creating (for example, shooting and/or editing), posting, and/or the like of multimedia content. Herein, the "multimedia content" may be various forms of content, including a video, an audio, an image, a set of images, a text, etc.

In the environment 100 of FIG. 1, if the application 120 is in an active state, the terminal device 110 may present a page 150 of the application 120 to the user 140. The page 150 may include various types of pages that can be provided by the application 120, such as a presentation page, a content creating page, a content editing page, a message page, a personal page, a shopping page, and/or the like of the multimedia content.

In some embodiments, the terminal device 110 communicates with server 130 to enable the provision of services to the application 120. The terminal device 110 may be any type of mobile terminal devices, fixed terminal device, or portable terminal device, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/video camera, a positioning device, a television receiver, a radio broadcast receiver, an e-book device, a gaming device, or any combination thereof, including accessories and peripherals for these devices or any combination thereof. In some embodiments, the terminal device 110 is also capable of supporting any type of user-specific interfaces (such as "wearable" circuitry, etc.). The server 130 are various types of computing systems/servers capable of providing calculation capabilities, including, but not limited to, a mainframe computer, an edge computing node, a computing device in a cloud environment, and/or the like.

It would be appreciated that the structure and function of the environment 100 are described for an example purpose only and are not intended to imply any limitation on the scope of the present disclosure.

During the page interaction, it is expected to conveniently and quickly enter a page providing a specific function. Embodiments of the present disclosure propose a solution for page interaction. In the solution, a non-tap gesture is used to conveniently switch to a specific page. Since the non-tap gesture may also be used for other page interaction, in the embodiments of the present disclosure, it is proposed to use the type of a specific interaction gesture and support switching to a specific page by the non-tap gesture in the specific page. Thus, this not only supports convenient and quick switching and access to the specific page, but also affects other interactions as little as possible.

Some example embodiments of the present disclosure will be described below with reference to the accompanying drawings.

Figure 2:
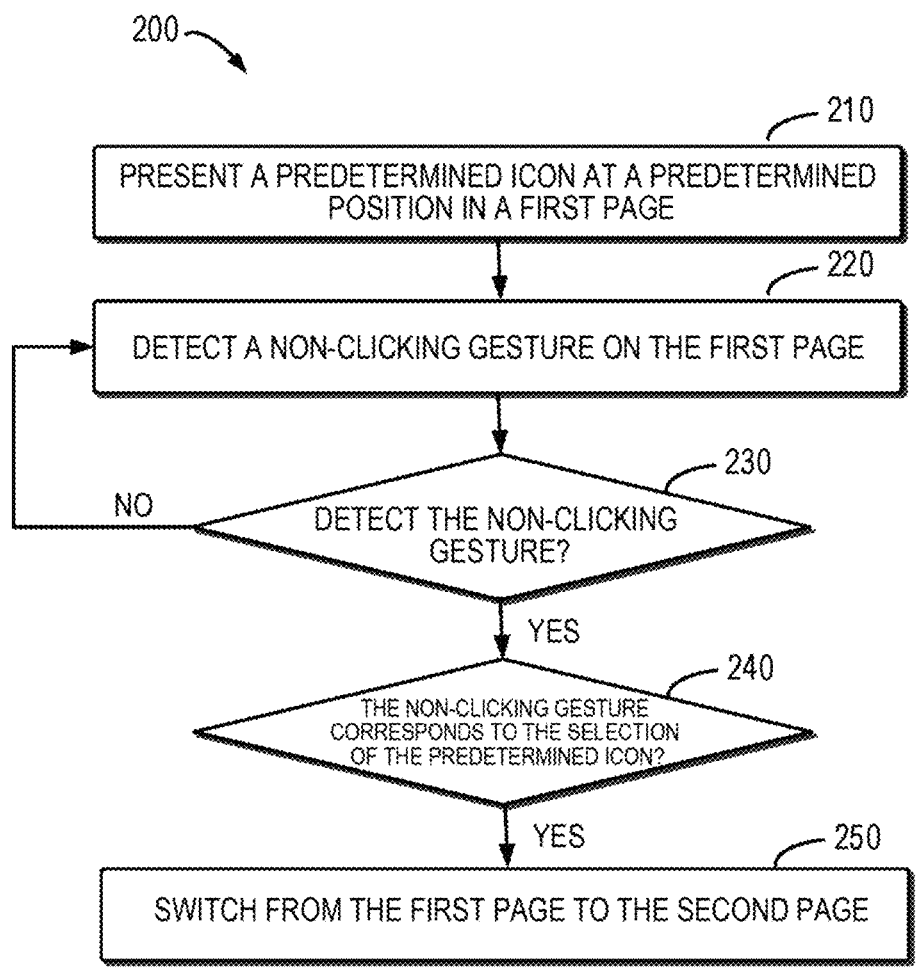
FIG. 2 shows a flowchart of a process for page interaction, according to some embodiments of the present disclosure.

FIG. 2 shows a flowchart of a process 200 for page interaction according to some embodiments of the present disclosure. The process 200 can be implemented at the terminal device 110. For the purpose of discussion, the process 200 will be described with reference to the environment 100 in FIG. 1.

At block 210, the terminal device 110 presents a predetermined icon at a predetermined position in a first page, where the predetermined icon is configured to access a second page.

In some embodiments, the page may be a page of an application, such as the page of the application 120. In other embodiments, the page may also be a non-application page, such as a web page, etc.

In a page layout, a navigation label can be used to quickly locate and access a certain page or certain pages. The navigation label generally occupies a certain size. Therefore, considering a limitation of a page size and in order to facilitate a user selection, too many navigation labels are usually unable to be laid out for accessing respective pages. Compared with the navigation label, the arrangement of icons needs to occupy a relatively small size, and for some pages, icons can be selected as access entries.

In embodiments of the present disclosure, the predetermined icon is arranged in a certain page, and the predetermined icon is configured to access another page. Herein, for the purpose of discussion, the page presenting the predetermined icon is referred to as a "first page", which may be any suitable page, and the page corresponding to the predetermined icon is referred to as a "second page", which may also be any suitable page. The second page is different from the first page.

In some embodiments, the first page and the second page may include a page in a multimedia sharing application. In some examples, the first page and the second page may include a page in a video sharing application. In some examples, the first page may include a video presentation page. In some examples, the second page may include a non-video presentation page or another video presentation page.

The presentation position (that is, "a predetermined position") of the predetermined icon in the first page may be set, according to the layout requirements. The presentation positions of the predetermined icons may be same or different for different pages, the present disclosure is not limited in this regard. The predetermined icon may be an icon configured to access any other page. As an example, the predetermined icon may be a message icon, corresponding to a message page capable of providing a messaging function. In other examples, the predetermined icon may be configured to access any other page, for example a presentation page of multimedia content (for example, a video presentation page), a content creation page, a content editing page, a personal page, a shopping page, and/or the like. In the examples below and in the accompanying drawings, a message icon in a video sharing application is illustrated as an example for purposes of discussion, but it would be appreciated that embodiments of the present disclosure are also applicable to other applications and other types of icons.

Figure 3A:
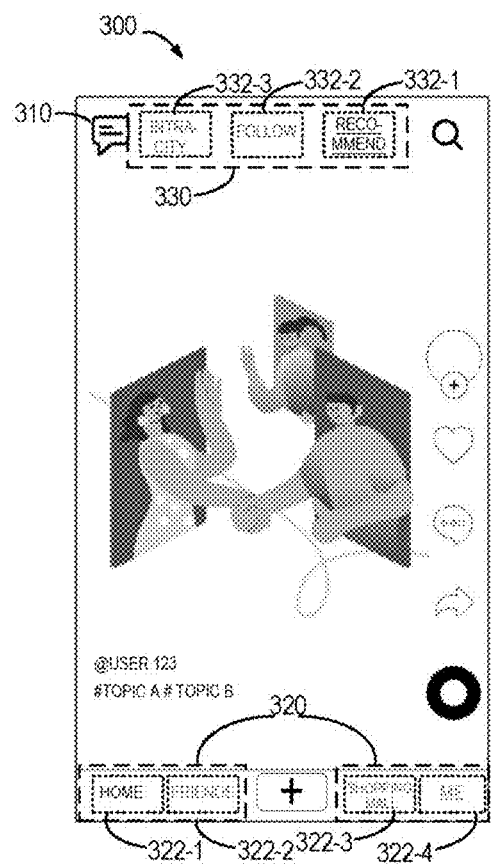
FIGS. 3A to 3E show schematic diagrams of interaction examples for page switching, according to some embodiments of the present disclosure.

FIG. 3A shows an example page 300 with a presentation of a predetermined icon in application 120. In this example, the application 120 is shown as a video sharing application, and the page 300 includes a video presentation page. The predetermined message icon 310 is presented in an upper left location of the page 300, for example, the upper left corner.

In other examples, the predetermined icon may also be arranged in other locations, for example an upper right location (for example, upper right corner), a lower left location (for example, lower left corner), or a lower right location (for example, lower right corner), and/or the like of the page.

In addition to the predetermined icons, the first page may also be arranged with one or more navigation labels. The navigation labels are usually used to facilitate the user in switching and accessing certain pages more quickly. In some implementations, pages corresponding to the navigation labels are deployed for the application 120 in accordance with a certain page navigation structure. The page navigation structure may have a level structure, including a plurality of levels, each level having one or more navigation labels, and one or more navigation labels of one level may also be connected to one or more navigation labels in a next level.

In the example of FIG. 3A, the page navigation structure has two levels, where a first level includes the navigation labels presented in navigation label bar 320, and a second level includes the navigation labels presented in navigation label bar 330.

As shown in FIG. 3A, the navigation bar 320 of the page 300 is located in the lower portion of the page 300, also referred to as the "lower navigation bar". A set of navigation labels are presented in the navigation label bar 320, including navigation labels 322-1, 322-2, 322-3, and 322-4 (collectively or individually referred to herein as navigation label 322 for the purpose of discussion). The navigation label 322-1 has a character "home", indicating that the navigation label corresponds to a homepage of the application 120; the navigation label 322-2 has a character "friend", indicating that the navigation label corresponds to a friend content page of the application 120; the navigation label 322-3 has a character "shopping", indicating that the navigation label corresponds to a shopping page of the application 120; the navigation label 322-4 has a character "Me", indicating that the navigation label corresponds to a user's personal page.

After selecting a navigation label of the navigation label bar 320, if the navigation label is also connected to one or more navigation labels of the second level, the navigation label of the second level would be presented in the navigation label bar 330. In the example shown in FIG. 3A, it is assumed that the navigation label 322-1 "Home" of the first level is selected. Accordingly, the plurality of the navigation labels of the second-level navigation label to which the navigation label 332-1 is connected are presented in the navigation label bar 330. Of course, in some implementations, one or more navigation labels of the first level may not be connected to one or more navigation labels of the second level.

The navigation label bar 330 is located in the upper portion of the page 300, also referred to as the "upper navigation label bar". The navigation label bar presents navigation labels 332-1, 332-2, and 332-3 (collectively or individually referred to herein as navigation label 332 for the purpose of discussion). These navigation labels are the navigation labels corresponding to the navigation label 322-1 at a higher level. The navigation label 332-1 has a character "recommend", indicating a recommended content page in which the recommended content of the application 120 can be presented; the navigation label 332-2 has a character "follow", indicating a followed content page in which content of a followed user can be presented; the navigation label 332-3 has a characters "intra-city", indicating a content page for a predetermined region (for example, a certain city). In some embodiments, although not illustrated in the figures, the navigation label bar 330 may additionally or alternatively include a navigation label corresponding to a friend content page. For example, the first-level navigation label 322-2 "friends" in the navigation label bar 320 may be arranged as the second-level navigation label under "home".

It would be appreciated that the navigation label bar 330 may also include more navigation labels, but these navigation labels are not explicitly shown in the page 300. For example, more navigation labels in the navigation label bar 330 may be presented by sliding left and/or right. In some embodiments, the presented locations of the first-level navigation label bar (for example, the navigation label bar 320) and the second-level navigation label bar (for example, the navigation label bar 330) in the page may be exchanged up and down, or the first-level navigation label bar and the second-level navigation label bar may be presented on the left and right sides of the page, respectively. No limitation in this regard is suggested in embodiments of the present disclosure.

By selecting these navigation labels in the navigation label bars 320 and 330, the user may access the corresponding page. For example, if the navigation label 322-1 "Home" of the first level is selected and the navigation label 332-1 "Recommend" of the second level is selected, the currently shown page 300 may be displayed, in which content of the "Recommend" page under the "Home" of the application 120 is presented. In some implementations, if there is no user selection, for example, when the user activates the application 120, default navigation labels (for example, the navigation labels "Home" and "Recommend") may be selected to present a default page (for example, a home recommendation page), in an absence of a user selection.

It would be appreciated that the page 300 in FIG. 3A and the pages in other accompanying drawings that will be described below, are only example pages, and a variety of page designs may exist in practice. The various graphical elements in a page may have different arrangements and different visual representations, one or more of which may be omitted or replaced, and one or more other elements may also be presented. Embodiments of the present disclosure are not limited in this regard.

At block 220, the terminal device 110 detects a non-tap gesture on the first page.

In a case that the first page is presented with a predetermined icon, the user may access the second page corresponding to the predetermined icon. In some cases, the navigation label may be arranged in a location in the first page that is relatively convenient for the user to click or select, and the predetermined icon may be located at a more marginal location. In addition, the size of the predetermined icon is generally small, and it is relatively difficult to select the predetermined icon in a tap mode. Therefore, in order to facilitate quick access to the second page, the present disclosure proposes an approach of entering the second page by a non-tap gesture. The non-tap gesture is generally more convenient for a user to perform operations in various regions of a screen in various cases.

If a non-tap gesture is detected, at block 240, the terminal device 110 determines, based on a type of the non-tap gesture and a location corresponding to the first page in a page navigation structure, whether the non-tap gesture corresponds to a selection of the predetermined icon. If it is determined that the non-tap gesture corresponds to the selection of the predetermined icon, at block 250, the terminal device 110 switches from the first page to the second page.

The non-tap gesture includes various interaction gestures for controlling page interaction in addition to the tap gesture. One example of the non-tap gesture may include a sliding gesture. The non-tap gesture may also include other interaction in addition to a gesture, for example, an eye tracking interaction, a face gesture interaction, and the like. The non-tap gesture generally does not require accurate positioning and tapping on a particular icon or location, and are therefore more convenient to operate.

Due to the convenience of the non-tap gesture, it is usually used in many page interaction cases. In order to better distinguish the access to the second page, in the embodiments of the present disclosure, it is proposed to determine, based on the type of the non-tap gesture and the location of the first page corresponding to the page navigation structure, whether the currently detected non-tap gesture is a selection corresponding to the predetermined icon. In particular, when a particular type of non-tap gestures is detected in a particular page, it is determined that the current non-tap gesture corresponds to a selection of a predetermined icon.

Different types of non-tap gestures may be used to indicate different interaction. In examples where the non-tap gesture includes a swipe gesture, the types of non-tap gestures may be differentiated by the direction of the swipe. In some embodiments, the type of the swipe gesture may include a swipe-left gesture, a swipe-right gesture, a swipe-up gesture, a swipe-down gesture, or a swipe gesture having other particular trajectories. In some embodiments, the type of one or more swipe gestures may be used to indicate a selection of a predetermined icon. In a case that the non-tap gesture includes other gestures of the non-swipe gesture, a particular type of non-tap gesture may also be set to indicate a selection of a predetermined icon.

In particular, if a non-tap gesture is detected on the first page, the terminal device 110 may determine whether the first page is located by a target navigation label (sometimes referred to as a "first target navigation label" for the purpose of discussion) in a first level of the page navigation structure and another target navigation label (sometimes referred to as a "second target navigation label" for the purpose of discussion) in a second level, and also determines whether the swipe gesture is a predetermined type of non-tap gestures.

In some embodiments, the swipe gesture in a predetermined direction in a particular page may be set to correspond to a selection of a predetermined icon. In one example, the swipe-right gesture may be set to correspond to the selection of the predetermined icon. In some embodiments, a swipe-left gesture in a particular page may be set to correspond to a selection of the predetermined icon. Therefore, the swipe gesture in the predetermined direction is a swipe-left gesture. Of course, a swipe-up gesture and/or a swipe-down gesture or other types of non-tap gestures on a particular page may also be set to correspond to the selection of the predetermined icon. In the examples below and in the accompanying drawings, the swipe-right gesture is used as an example interaction gesture for the selection of a predetermined icon for purposes of discussion, but it would be appreciated that embodiments of the present disclosure are also applicable to other types of interaction gestures.

In some embodiments, considering that there are a lot of interaction gestures which may be triggered by a user during use, and the type of the non-tap gesture convenient for a user to operate is relatively limited, when a certain type of non-tap gestures are detected on a particular page, it is determined that the non-tap gesture corresponds to the selection of a predetermined icon. Considering that the level relationship of the page navigation structure, such pages may be located by particular navigation labels (referred to as "target navigation labels") of various levels of the page navigation structure.

In some embodiments, if the first target navigation label used to locate the first page in the first level is used to locate to a plurality of navigation labels in the second level, that is, the second level includes a plurality of navigation labels, then these navigation labels may be arranged in parallel in a row, for example, may be presented in parallel in a navigation label bar of the first page. The second target navigation label for locating the first page in the second level may include a navigation label that is arranged to be a leftmost location or a rightmost location among the plurality of navigation label bars. In some embodiments, the leftmost navigation label and the rightmost navigation label may be simultaneously set as navigation labels in the second level for locating the first page. That is, there may be two navigation labels in the second level for locating different pages, and non-tap gestures of a pre-determined type in these pages all correspond to the selection of the pre-determined icon.

In some examples, the first target navigation label for locating the first page in the first level may include a navigation label for locating a set of pages corresponding to the homepage. For example, in the example of FIG. 3A, navigation label 322-1 "Home" may be set as the target navigation label in the first level, which locates the plurality of navigation labels in the second level corresponding to the homepage, that is, the plurality of navigation labels 332 that are arranged and presented in parallel in a navigation label bar 330. In some embodiments, in a page located by the rightmost navigation label 332-1 "Recommend" and/or the leftmost navigation label 332-3, the non-tap gesture of the predetermined type corresponds to the selection of the message icon 310.

In some embodiments, if it is determined at block 240 that the non-tap gesture does not correspond to the selection of the predetermined icon, the terminal device 110 may also determine whether the non-tap gesture corresponds to other predetermined interactions and perform a corresponding operation. If the non-tap gesture does not correspond to any predetermined interaction, no response may be performed.

The selection of the predetermined icon and the switching of the second page will be explained below with reference to examples of the accompanying drawings.

Figure 3B:
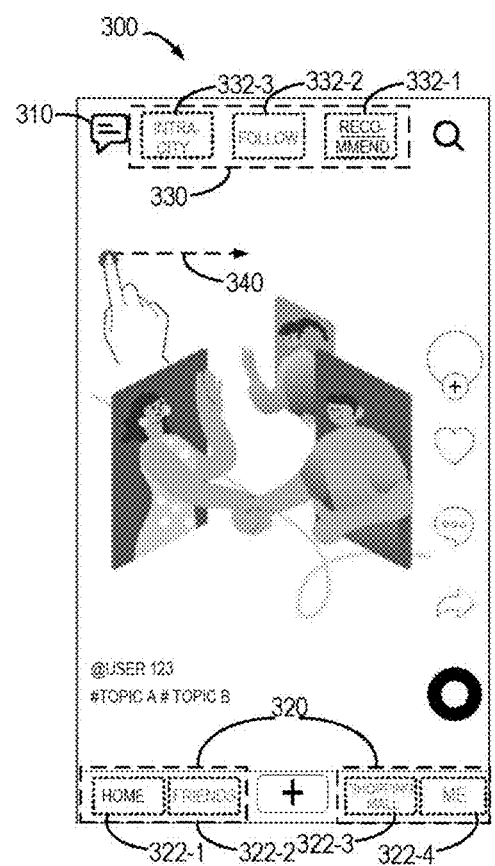
Figure 3C:
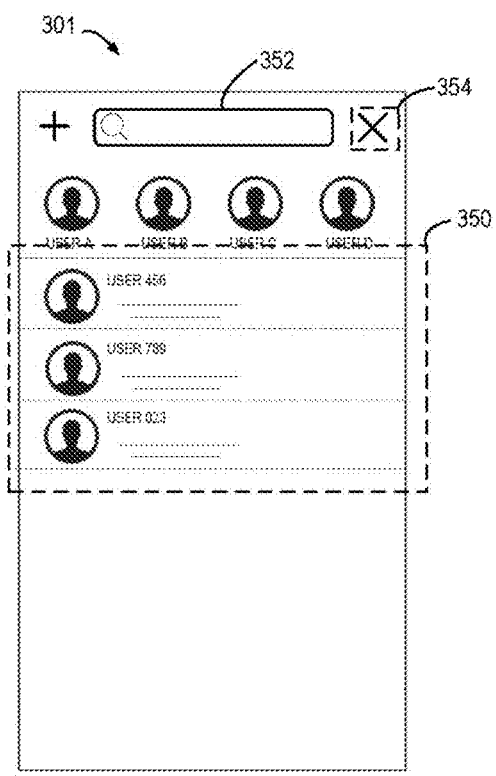

FIG. 3B shows the detection of a swipe gesture 340 at the page 300. After detecting the swipe gesture 340, it is determined that the type of the swipe gesture 340 is a swipe-right gesture. The page 300 is a page (sometimes referred to as a "Home Recommend" page) located by the first-level navigation label 322-1 "Home" and the rightmost navigation label 332-1 "Recommend" in the second level. Thus, it may be determined that the swipe gesture 340 corresponds to a selection of the message icon 310. Accordingly, the application 120 switches from the current page 300 to the message page 301 as illustrated in FIG. 3C. That is, in the rightmost "Home Recommend" page, the message page may be quickly switched to by a swipe-right gesture.

The message page 301 provides a function of messaging. In the example of FIG. 3C, the message page 301 can include a message session area 350 in which presents a message session with one or more users, and/or other message notifications. The message page 301 further presents a search box 352, which provides a search function. In addition, the message page 301 further provides an exit icon 354, and a selection or tap on the exit icon 354 may close the message page 301. It would be appreciated that FIG. 3C only shows an example layout of the message page. Any layout design may be possible on the message page according to actual needs.

Figure 3D:
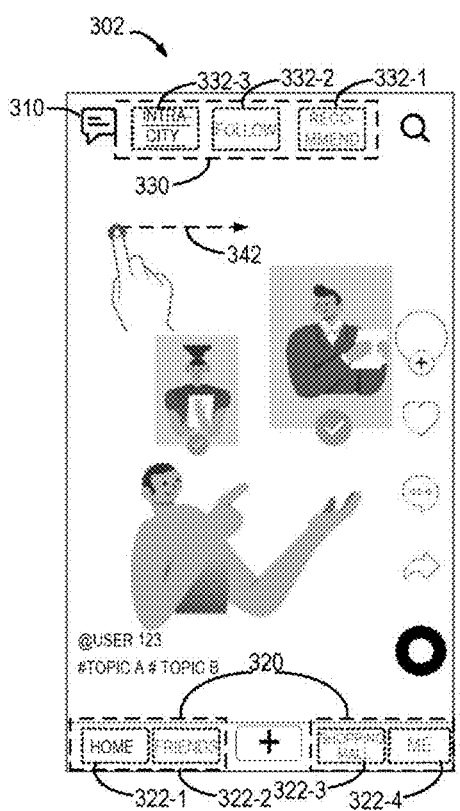

In some embodiments, alternatively or in addition, as shown in FIG. 3D, in the second level of the plurality of navigation labels located by the first level of navigation labels 322-1 "Home", the leftmost navigation label 332-3 "Intra-city" is located in the page 302 (sometimes referred to as a "Home Intra-city"). If a swipe-right gesture 342 is detected, it further may be determined that the swipe gesture corresponds to the selection of the message icon 310. Accordingly, a switch is made from the current page 302 to the message page 301 shown in FIG. 3C.

In some embodiments, it may be provided that in a case that the non-tap gesture of the predetermined type is detected in a particular area of a particular page, the non-tap gesture of the predetermined type may be determined to correspond to the selection of the predetermined icon. For example, if a swipe-right gesture is used to indicate a selection of a predetermined icon, then if a swipe-right gesture is detected in a left area of the first page, for example, a left ½ area or a left ⅓ area, the swipe gesture may be determined to correspond to the selection of the predetermined icon. Of course, any other area may also be set, or the detected swipe gesture in a particular direction in the whole page is determined as the selection corresponding to the predetermined icon.

Figure 3E:
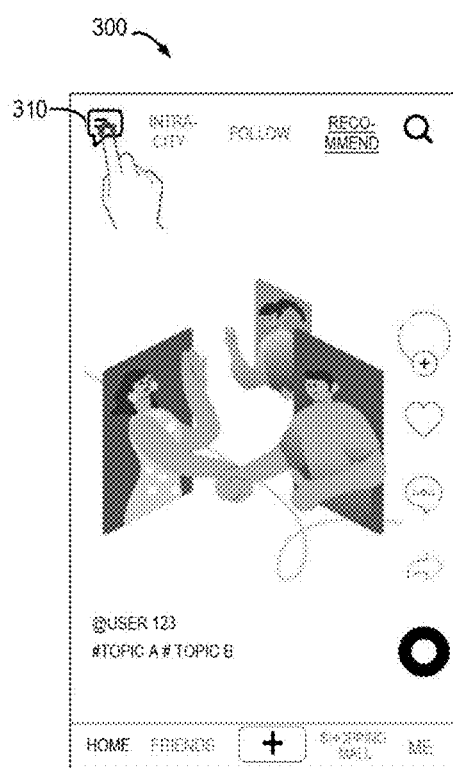

In some embodiments, in addition to using a non-tap gesture, a corresponding second page may additionally be entered by a tap gesture on the predetermined icon. As shown in FIG. 3E, if a tap gesture on the message icon 310 in the upper left corner is detected in the page 300, the application 120 may switch from the current page 300 to the message page 301 shown in FIG. 3C. In addition to the page 300, in any other page presented with the message icon 310, the corresponding message page may also be entered by the tap gesture of the message icon 310.

In some embodiments, among the plurality of pages located by a first target navigation label of a first level, if a non-tap gesture of the pre-determined type (for example, a swipe-right gesture) is detected on a certain page of the pages, but the page is not the page located by the leftmost or the rightmost navigation label of the second level, then the non-tap gesture may correspond to a switch between pages corresponding to the plurality of navigation labels of the second level. For example, if a swipe-right gesture is detected in the page corresponding to the navigation label 322-1 "Home" and the navigation label 332-2 "Follow", the page may be switched to the page corresponding to the navigation label 332-3 "intra-city".

In some cases, some interaction functions may be provided after the user logs into the application 120. Thus, in some embodiments, if the predetermined icon is a non-login icon, the presentation of the predetermined icon and the mode of page switch in a particular page by a non-tap gesture may be provided when the user has logged in. Specifically, the terminal device 110 may determine whether the user has logged into the application 120, and if it is determined that the user has logged into the application 120, present the predetermined icon (for example, a non-login icon) at a predetermined location in the first page. In some embodiments, the non-login icon may be configured to access a page other than the login page.

Figure 4A:
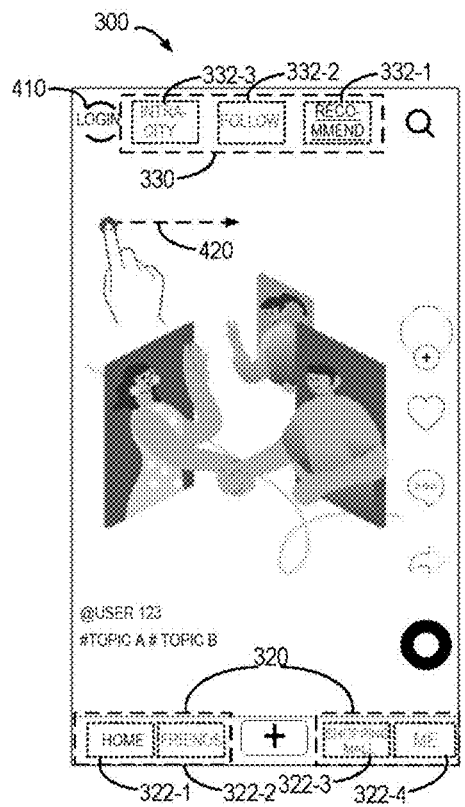
FIGS. 4A to 4D show schematic diagrams of examples of providing a login icon in a page, according to some embodiments of the present disclosure.

In some embodiments, if it is determined that the user is not logged into the application 120, a login icon may be presented in the same predetermined location in the first page. As shown in FIG. 4A, a login icon 410 is presented in the upper left corner of the page 300 instead of the message icon 310 as shown in the example of FIG. 3A. The selection of the login icon may enter the login page of the user.

In some embodiments, the selection of the login icon can be provided in a similar mode to the interaction gesture of the non-login icon. Specifically, the selection of the login icon may be supported to be indicated by a particular type of non-tap gestures on a particular page, thereby entering the login page. In this way, in a case that the user does not log into the application, if the terminal device 110 detects a non-tap gesture on the first page, it may be determined, based on the type of the non-tap gesture and the location that corresponds to the first page in the page navigation structure, whether the non-tap gesture corresponds to the selection of the login icon. In the case that the user is not logged in to the application, the same type of non-tap gestures under the same page can be used to indicate the selection of the login icon. If it is determined that the detected non-tap gesture corresponds to the selection of the login icon, the terminal device 110 may switch from the current first page to the login page.

Figure 4B:
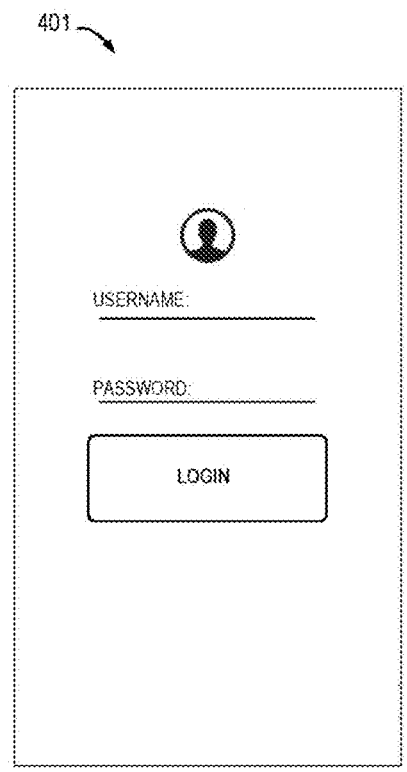

As shown in FIG. 4A, if a swipe-right gesture 420 is detected in the page 300 located by the first-level navigation label 322-1 "Home" and the rightmost second-level navigation label 332-1 "Recommend", the application 120 may switch from the page 300 to a login page 401 as shown in FIG. 4B. A user may input login information, such as a username and a password, on the login page 401 for login to the application 120.

Figure 4C:
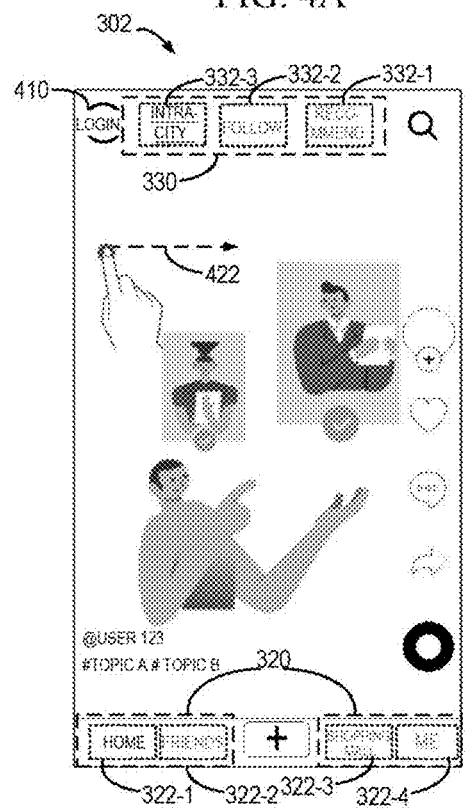

In another example shown in FIG. 4C, if a swipe-right gesture 422 is detected in the page 300 located by the first-level navigation label 322-1 "Home" and the leftmost second-level navigation label 332-3 "Recommend", the application 120 may also switch from the page 300 to the page 401 as shown in FIG. 4B.

Figure 4D:
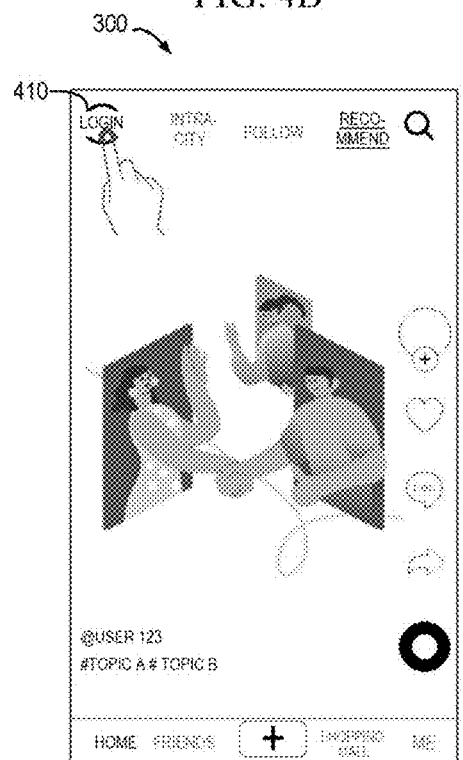

In some embodiments, in addition to the non-tap gesture, the user may be allowed to enter the login page by tapping on the login icon. As shown in FIG. 4D, if the user's tap gesture on the login icon 410 is detected in the page 300, the application 120 may also switch from the page 300 to the login page 401 as shown in FIG. 4B.

In some embodiments, after the user completes login in the login page, the first page may continue to be presented, and a predetermined non-login icon may be presented at the predetermined location in the first page to facilitate the user to access a corresponding second page.

In some embodiments, when switching from the first page to the second page, sliding of the content container may be used to present the content of the second page. The content container is used to contain the content to be displayed.

In a page navigation structure with tiers, if a page is located by two levels of navigation labels, a content container corresponding to each layer may be provided. The content container corresponding to the first level (referred to as an "outer content container") is used to slide between pages that can be swiped to switch in the first level. If a navigation label in the first level locates a plurality of pages, the content container corresponding to the second level (referred to as an "inner content container") slides within the plurality of pages under this navigation level.

In some embodiments, if a swipe-right gesture is supported on the first page to enter the second page, a different swipe-left gesture may be supported on the first page (e.g., the "Home Recommend" page) to enter another page, for example a personal page. In this way, the outer content container can slide between the second page, the first page, and the personal page to accommodate content from different pages.

Figure 5:
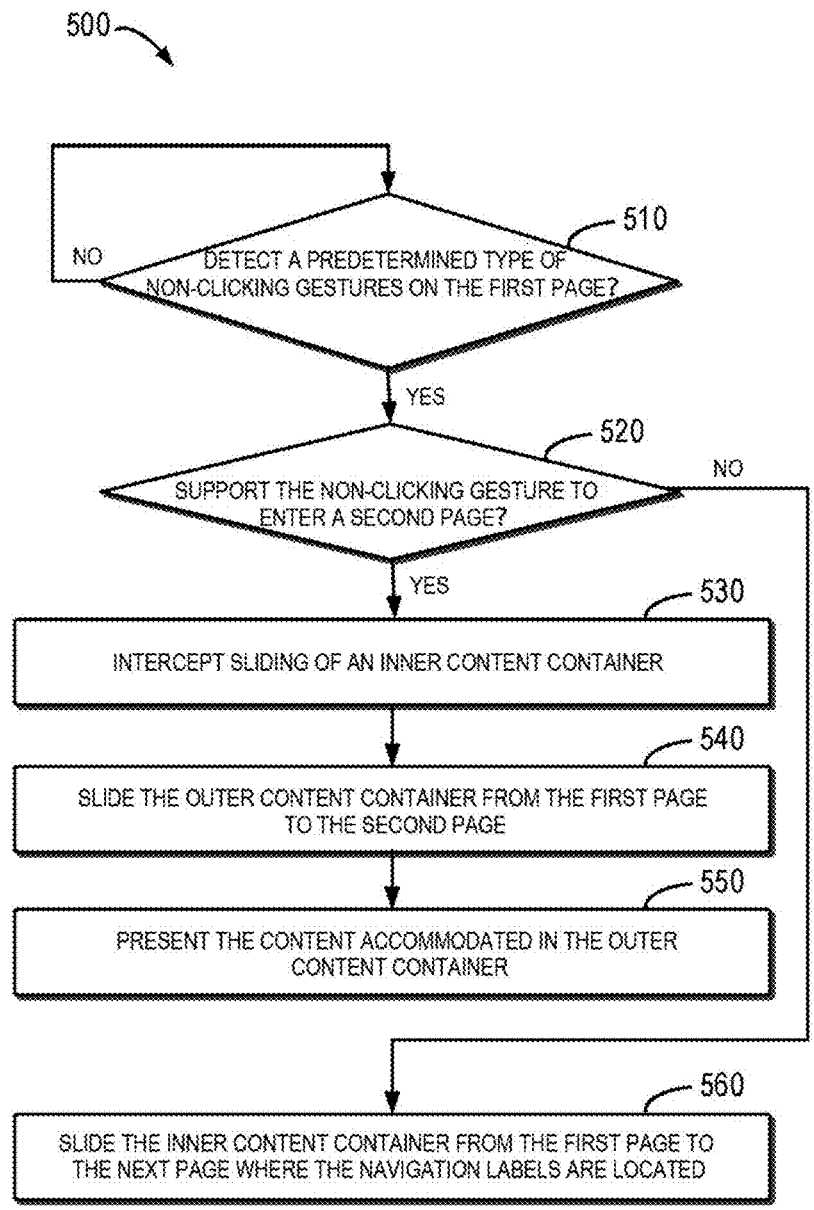
FIG. 5 shows a flowchart of a process for presenting a page, according to some embodiments of the present disclosure

FIG. 5 shows a flowchart of a process 500 of presentation page, according to some embodiments of the present disclosure. The process 500 may be implemented at the terminal device 110.

At block 510, the terminal device 110 determines whether a non-tap gesture of a predetermined type is detected on the first page located by the first target navigation label and the second target navigation label. For example, the terminal device 110 determines whether a swipe-right gesture is detected in the "Home Recommend" page 300.

Figure 6A:
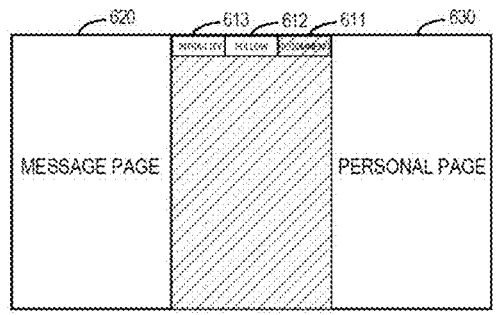
FIGS. 6A to 6F show schematic diagrams of examples of a content container sliding process, according to some embodiments of the present disclosure.

FIG. 6A shows a schematic of a structure comprising inner and outer content containers for the presentation of pages in the application 120. In the example of FIG. 6A, the outer content container slides to a page located by the first-level navigation label "Home", and the inner content container slides to a page 611 located by the second-level navigation label "Recommend". The application 120 presents the content presented by these two content containers, that is the content of the page 611.

If a predetermined type of non-tap gestures are not detected on the first page, the terminal device 110 may periodically or continuously perform detection of the particular page and the non-tap gesture.

In some embodiments, it may be supported that the second page is entered in some versions, or some modes of the application 120 by a particular type of non-tap gestures on a particular page, and that the type of non-tap gestures correspond to switching between a plurality of pages located by respective navigation labels of a plurality of navigation labels arranged in parallel in the second level in other versions or other modes. In this case, if the predetermined type of the non-tap gesture is detected on the first page, at block 520, the terminal device 110 determines whether the application 120 supports the non-tap gesture to enter the second page.

If a non-tap gesture is supported to enter the second page, at block 530, the terminal device 110 intercepts the sliding of the inner content container, to avoid the inner content container to move between the navigation labels at the second level. Then, at block 540, the terminal device 110 slides the outer content container from the first page to the second page to accommodate the content of the second page. At block 550, the terminal device 110 presents the content accommodated in the outer content container.

Figure 6B:
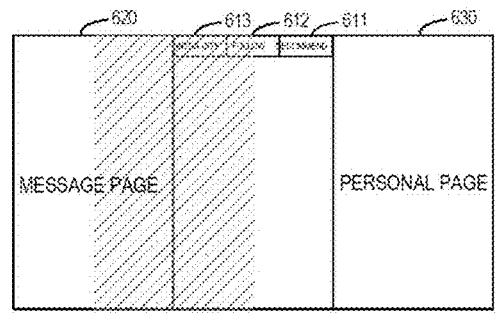
Figure 6C:
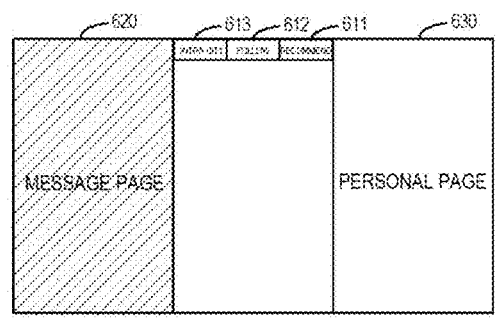

FIG. 6B shows an example of a sliding process of an outer content container. In this example, it is assumed that a predetermined type of non-tap gestures are detected on the page 611, which corresponds to the selection of the message icon. Accordingly, the outer content container slides from the page 611 to the left to the message page 620 corresponding to the message icon. FIG. 6C shows an example after the outer content container slides to the message page 620. At this time, the content of the message page 620 accommodated in the outer content container may be presented.

In some embodiments, if a non-tap gesture of a different type is detected on some first pages, for example a swipe-left gesture, the outer content container may slide to the right to a page in another direction in the first level, for example a personal page 630, to accommodate the content of the page. The first page supporting the swipe-left gesture to enter the personal page 630 can include the rightmost navigation label in the second level, for example, the navigation label "Recommend" that is arranged on the rightmost side of the plurality of second-level navigation labels in FIG. 6A.

In some embodiments, if it is determined that at block 520 the non-tap gesture to enter the second page corresponding to the predetermined icon is not supported, at block 560, the terminal device 110 slides the inner content container from the first page to the next page where the navigation label is located.

Figure 6D:
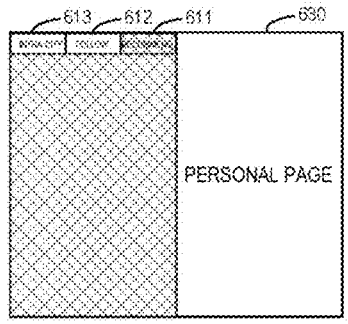
Figure 6E:
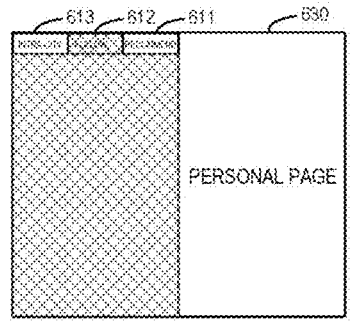
Figure 6F:
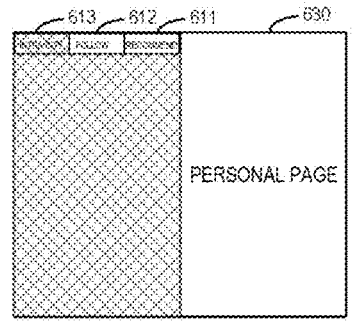

For example, FIG. 6D shows that the message page 620 would not exist in an architecture of the outer content container sliding without support of a non-tap gesture to enter the message page. The current first page is the page 611 where the first-level navigation label "Home" and the second-level navigation label "Recommend" are located. In a case that a particular type of non-tap gestures (for example, a swipe-right gesture) are detected, the inner content container is swiped to the left to the page 612 where the navigation label "Follow" is located, as shown in FIG. 6E. Accordingly, the content of page 612 can be presented. If a particular type of non-tap gestures (for example, a swipe-right gesture) are further detected on the page 612, the inner content container can continue to slide to the left to page 613 where the navigation label "Intra-city" is located, as shown in FIG. 6F.

In some scenarios of messaging, a prompt for new messages/unread messages may be provided in the current page. In some embodiments, if the message icon is presented on the first page, a message prompt may be presented on the first page upon detection of an incoming message. The message prompts can be presented in a variety of ways. In some embodiments, the approach for presenting the message prompt may be related to a source of the message, in particular the source of the latest message.

In particular, it may be determined whether the message is a friend message from a logged-in user of the application 120. If it is determined that the message is the friend message from the logged-in user of the application 120, the message icon may be deformed into a first message prompt marker, and when the message is a non-friend message, a second message prompt marker may be presented in association with the message icon. The second message prompt marker is different from the first message prompt marker, so that the friend message can be distinguished from the non-friend message.

Figure 7A:
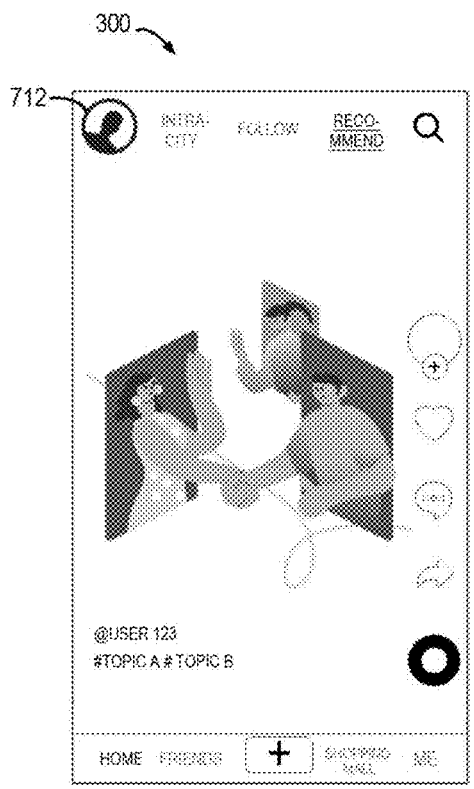
FIGS. 7A to 7C show schematic diagrams of examples of providing message prompts in a page, according to some embodiments of the present disclosure.

The first message prompt marker may be associated with the user sending the friend message, for example, may be deformed to display an avatar icon or other identification of the user sending the friend message. FIG. 7A shows such a message prompt. As shown in FIG. 7A, due to the unread message, the message icon 310 originally presented in the upper left corner of the page 300 is deformed to a first message prompt marker 712, which corresponds to a friend avatar icon sending the friend message. In this way, the user can notice a new message from a friend more quickly, and can know which friend the message is from without entering a detailed message page. This can facilitate the checking of the user's message and improve the interaction experience.

Figure 7B:
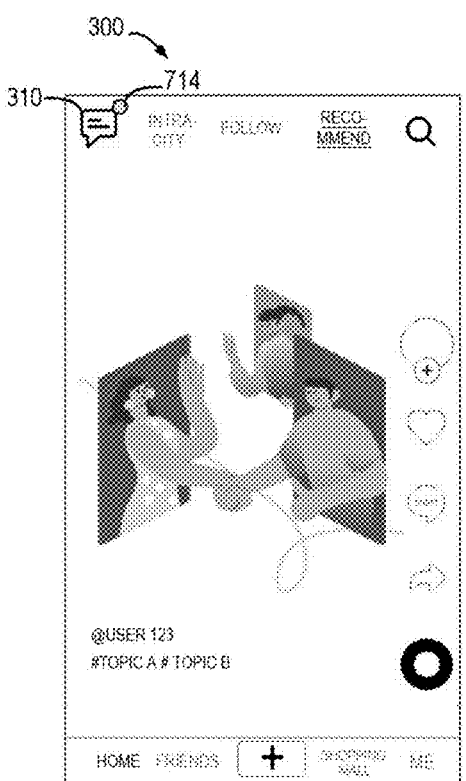
Figure 7C:
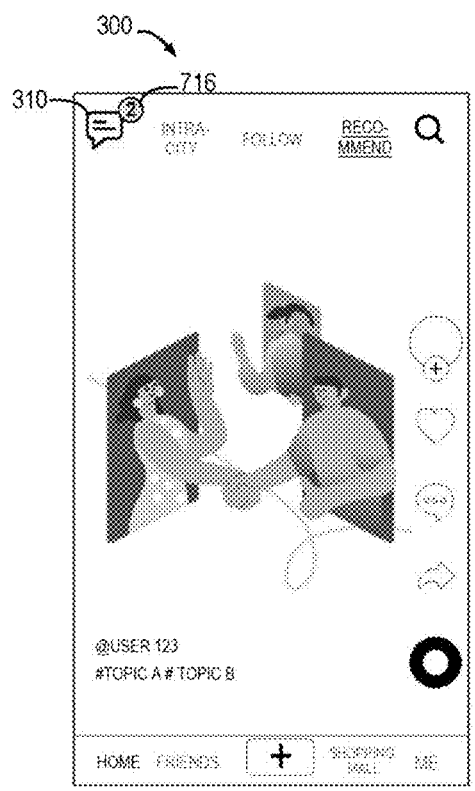

In some embodiments, if the message is a non-friend message, a second message prompt marker may be presented overlaying on the message icon. The second message prompt marker may include a small red dot or a numeric red dot indicating the number of messages to prompt (that is, a number plus a small red dot). For example, FIG. 7B shows an overlay presentation of a small red dot 714 on the message icon 310 of the page 300 as a message prompt marker; FIG. 7C shows an overlay presentation of a numeric red dot 716 on the message icon 310 of the page 300 as a message prompt marker, which can indicate the number of unread messages.

In some embodiments, the message prompt marker may no longer be presented if the user has read the message. In some embodiments, the message prompt may be degraded in order to reduce interference with the user when browsing content or page interactions. For example, the first message prompt marker associated with a friend has a significant prompt effect on a message, and compared with an ordinary small red dot and a numeric red dot, the first message prompt marker interferes with a user greatly. In some embodiments, if it is determined that the currently presented message prompt marker satisfies the prompt degradation policy, the currently presented message prompt marker may be degraded to another message prompt marker with a smaller interference degree. For example, the deformed first message prompt marker may be degraded to numeric red dots or small red dots, numeric red dots may be degraded to small red dots, and so on.

In some embodiments, the prompt degradation policy may be related to a presentation time of the message prompt marker, related to a number of unread messages, related to the user's interaction state, and so on. Embodiments of the present disclosure are not limited in this regard.

In some embodiments, after entering the second page corresponding to the predetermined icon, one or more interaction modes may also be provided to allow the user to exit the second page. If the detected interaction gesture on the second page corresponds to an exit of the second page (for example, corresponding to a selection of an exit icon on the second page), a switch may be made from the second page to the first page, that is, entering a previous page of the second page.

In some embodiments, the interaction gesture corresponding to the exit of the second page may include a tap gesture on the exit icon on the second page. In some embodiments, alternatively or in addition, the interaction gesture corresponding to the exit of the second page may include another predetermined type of non-tap gestures, for example a swipe gesture in a predetermined direction. In some embodiments, the predetermined type of non-tap gestures for exiting the second page may be different from the predetermined type of non-tap gestures for entering the second page. In some embodiments, if the non-tap gesture includes a swipe gesture, the direction of the swipe gesture for exiting the second page may be different from the direction of the swipe gesture for entering the second page. For example, if the swipe gesture for entering the second page is a swipe-right gesture, the swipe gesture for exiting the second page may be a swipe-left gesture, or another swipe gesture for example a swipe-up gesture or a swipe-down gesture. By setting different types of non-tap gestures, it is convenient for the user to operate, and it helps the user to quickly get familiar with the way of entering and exiting the second page, thereby improving the user experience.

In some embodiments, according to actual needs, the type of non-tap gestures for exiting the second page may also be set to be the same as the non-tap gesture for entering the second page. For example, they may both be swipe-right gestures.

Figure 8A:
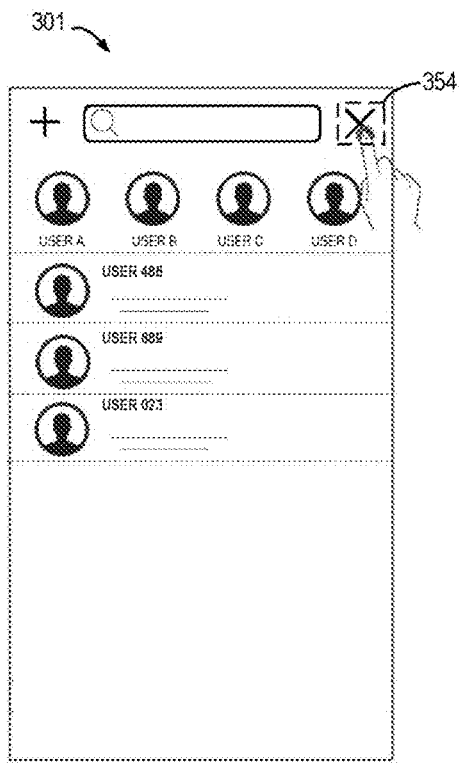
FIGS. 8A to 8C show schematic diagrams of examples of interactions that exit from a second page, according to some embodiments of the present disclosure.
Figure 8B:
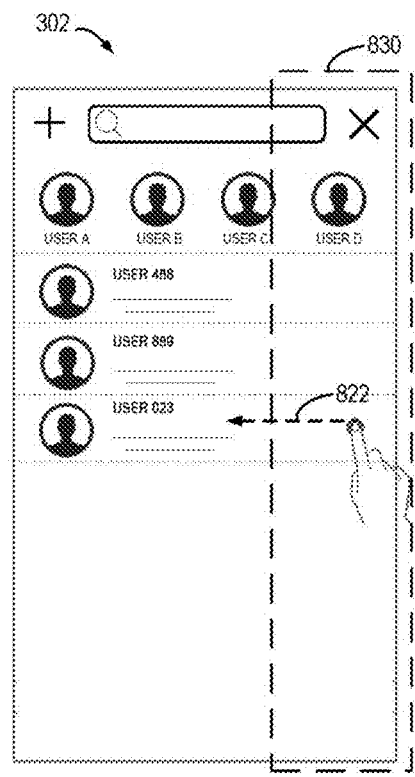
Figure 8C:
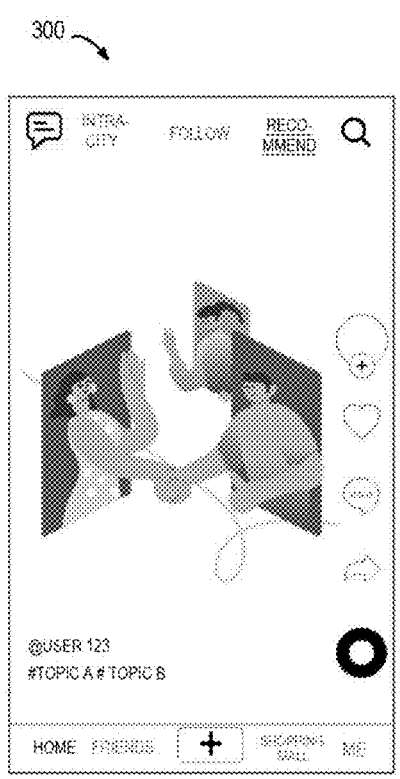

As some examples, if a user's tap on the exit icon 354 is detected in the message page 301 as shown in FIG. 8A, or a swipe-left gesture 822 is detected in the message page 301 as shown in FIG. 8B, a switch may be made from the message page 301 to the first page 300 as shown in FIG. 8C. In the implementation of the content container, for example in the example of FIG. 6C, the outer content container slides from the message page 620 to the previous page 611.

In some embodiments, it may be provided that when a predetermined type of non-tap gestures are detected in a predetermined area of the second page, the non-tap gesture is determined to correspond to an exit from the second page. For example, if a swipe-left gesture is used for the exit of the second page, then when detecting the swipe-left gesture in a right area of the first page, for example, a right ½ area or a right ⅓ area, the swipe gesture may be determined to correspond to the exit of the second page. Of course, any other area may also be set, or a detected non-tap gesture of a predetermined type in the whole second page may be determined to correspond to the exit from the second page.

To help the user quickly understand and grasp an approach for the exit from the second page, in some embodiments, if it is determined that the second page is presented for the first time in the application 120, a guide mask layer may be overlaid on the second page, and an exit guide information may be presented on the guide mask layer, where the exit guide information indicates an interaction gesture for the exit from the second page. In some examples, the exit guide information may include an exit guide animation, to better show the exit manner. In other examples, additionally or in addition, the exit guide information may also include a text, an image, and/or any other form of guide.

Figure 8D:
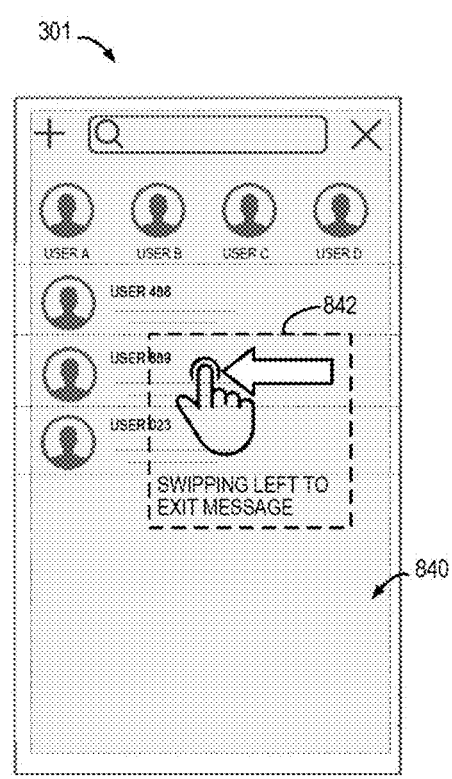
FIG. 8D shows a schematic diagram of a page exit guidance, according to some embodiments of the present disclosure.

As shown in FIG. 8D, a guide mask layer 840 is overlaid on the message page 301, which includes an exit guide information 842 to indicate that the message page can be exited by swiping-left. In some examples, the exit guide information 842 can also indicate that the message page can also be exited by tapping an exit icon in the upper right corner.

In some embodiments, if a message of the application 120 is received, a message prompt pop-up window can also be presented within the application 120 or outside of the application 120 (for example, the application 120 is not currently activated).

Figure 9A:
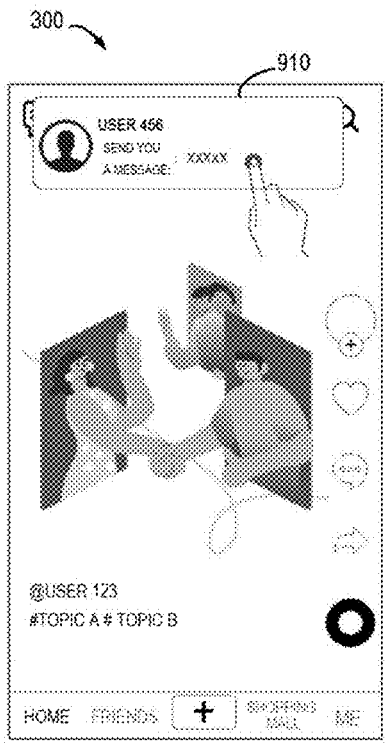
FIGS. 9A to 9D show schematic diagrams of interaction examples of message pop-up windows, according to some embodiments of the present disclosure.
Figure 9B:
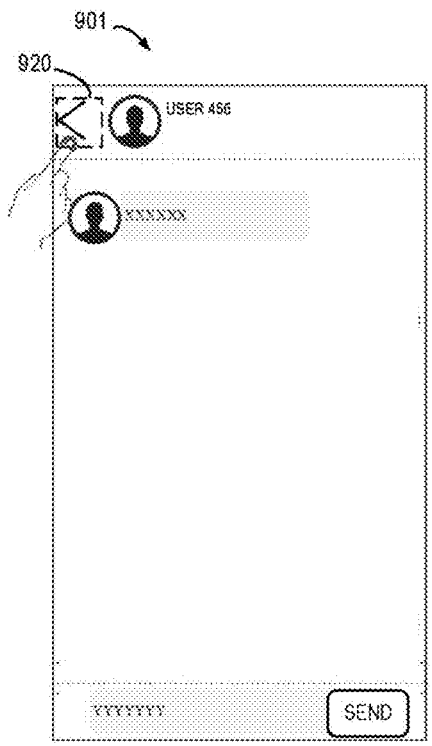

In some embodiments, if a message prompt pop-up window is presented on a first page, and a user selection of the message prompt pop-up window is detected, then a switch may be made directly from the first page to a message session page corresponding to the message. FIG. 9A shows a message prompt pop-up window 910 presented on the first page 300 of the application 120. If the user selects the message pop-up window, for example, by a tap gesture, the page switches directly to the message session page 901 as shown in FIG. 9B. The user may conveniently make a dialogue in the message session page 901.

Figure 9C:
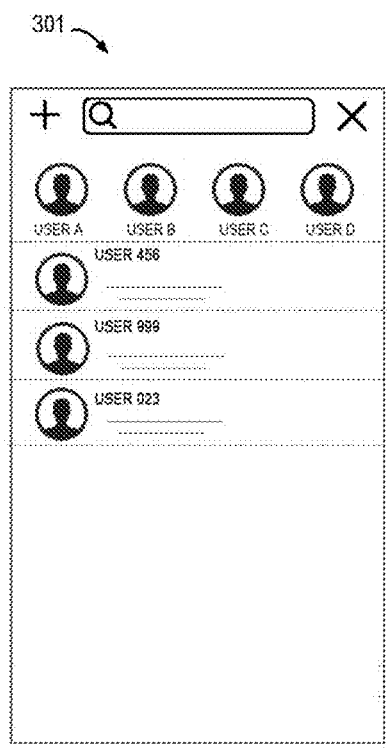

In some embodiments, if an interaction gesture indicating an exit from the message session page is detected, for example, a user selection of a back icon 920 is detected in the message session page 901 of FIG. 9B, a switch may be made from the message session page to the message page, for example from the message session page 901 to the message page 301 as shown in FIG. 9C. In some embodiments, if the exit continues from the message page in this case, then a switch may be made to the first page where the message prompt pop-up window was previously presented.

Figure 9D:
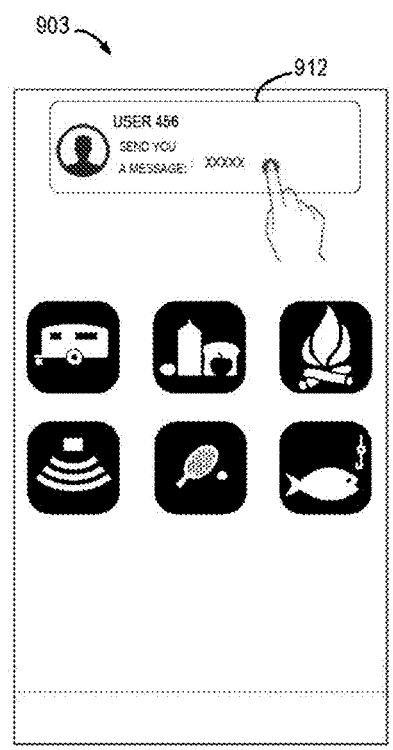

In some embodiments, if a message prompt pop-up window is presented in a page outside of the application and a selection of the message prompt pop-up window is detected, a message session page corresponding to the message may also be presented. For example, as shown in FIG. 9D, if a message of the application 120 is received but a page of the application 120 is not currently presented, a message prompt pop-up window 912 may be presented on a page 903 outside the application 120 of the terminal device 110. If a selection of the message prompt pop-up window 912 is detected, the page may be switched to the message session page 901 as shown in FIG. 9B. Further, if the interaction gesture indicating the exit from the message session page continues to be detected in the message session page, a switch may be made from the message session page to the message page. In some embodiments, if the exit from the message page continues in this case, then a default page of the application 120, for example, a "Home Recommend" page, may be switched to. Of course, the scope of the present disclosure is not limited in this regard.

Figure 10:
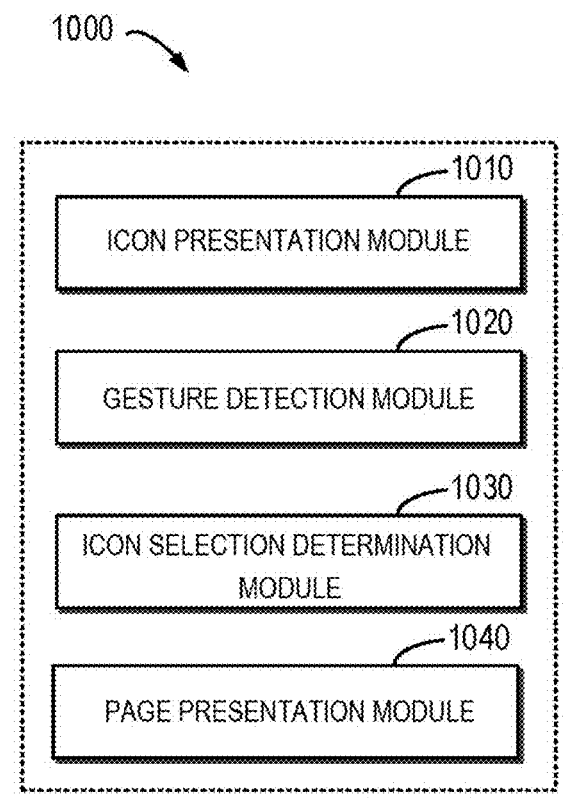
FIG. 10 shows a block diagram of an apparatus for page interaction, according to some embodiments of the present disclosure.

FIG. 10 shows a schematic structural block diagram of an apparatus 1000 for page interaction, according to some embodiments of the present disclosure. The apparatus 1000 may be implemented as or included in the terminal device 110. The various modules/components in the apparatus 1000 may be implemented by a hardware, a software, a firmware, or any combination thereof.

As shown, the apparatus 1000 includes an icon presentation module 1010 configured to present a predetermined icon at a predetermined location in a first page, the predetermined icon configured to access a second page. The apparatus 1000 further includes a gesture detection module 1020 configured to detect a non-tap gesture on the first page; and an icon selection determination module 1030 configured to determine, in response to the non-tap gesture being detected, whether the non-tap gesture corresponds to a selection of the predetermined icon, based on a type of the non-tap gesture and a location corresponding to the first page in a page navigation structure. The apparatus 1000 further includes a page presentation module 1040 configured to, in response to determining that the non-tap gesture corresponding to a selection of the predetermined icon, switch from the first page to a second page.

In some embodiments, the first page and the second page include a page in a multimedia sharing application. In some examples, the first page and the second page include a page in a video sharing application. In some examples, the first page includes a video presentation page. In some examples, the second page includes a non-video presentation page or another video presentation page.

In some embodiments, the icon selection determination module 1030 is configured to: in response to determining that the first page is located by the first target navigation label in the first level and the second target navigation label in the second level of the page navigation structure, determining whether the non-tap gesture is a non-tap gesture of a predetermined type; in response to determining that the non-tap gesture is the non-tap gesture of the predetermined type, determining that the non-tap gesture corresponds to the selection of the predetermined icon.

In some embodiments, the second level comprises a plurality of navigation labels arranged in parallel in a row, the second target navigation label being at a rightmost location or a leftmost location among the plurality of navigation labels.

In some embodiments, the non-tap gesture of the predetermined type comprises a swipe-right gesture or a swipe-left gesture.

In some embodiments, the first target navigation label is used to locate a set of pages corresponding to a homepage, the set of pages comprising at least the first page. In some embodiments, respective pages of the set of pages are further located by respective navigation labels in the second level.

In some embodiments, a page switching module comprises: a container swipe module configured to slide a content container corresponding to the first level from the first page to the second page to accommodate content of the second page; and a container content presentation module configured to present the content accommodated in the content container.

In some embodiments, the first level comprises at least one of the following navigation labels: a navigation label corresponding to a homepage, a navigation label corresponding to a shopping page, and a navigation label corresponding to a friend content page. In some embodiments, the second level comprises at least one of the following navigation labels: a navigation label corresponding to a recommended content page, a navigation label corresponding to the friend content page, a navigation label corresponding to a concerned content page, and a navigation label corresponding to the content page in a predetermined area.

In some embodiments, the navigation label in the first level is presented at one of a lower or upper portion of the first page, and the navigation label in the second level is presented at the other of the lower or the upper portion of the first page.

In some embodiments, the predetermined location comprises an upper left location, an upper right location, a lower left location, or a lower right location of the first page.

In some embodiments, the predetermined icon comprises a message icon corresponding to a message page. In some embodiments, the apparatus 1000 further comprises: a message detection module configured to detect a message; and a prompt presentation module configured to in response to the message being detected, presenting a message prompt on the first page.

In some embodiments, the prompt presentation module comprises: a first presentation module configured to, in response to determining that the message is a friend message of a logged-in user, deforming the message icon into a first message prompt marker; and a second presentation module configured to in response to determining that the message is a non-friend message, presenting a second message prompt marker in association with the message icon.

In some embodiments, the first message prompt marker is associated with a user who send the friend message.

In some embodiments, the prompt presentation module comprises: a third presentation module configured to present a third message prompt marker on the first page; and a fourth presentation module configured to in response to determining that presentation of the third message prompt marker satisfies a prompt degradation strategy, change the third message prompt marker to a fourth message prompt marker.

In some embodiments, the apparatus 1000 further comprises: a messaging detection module configured to detect an interaction gesture on the second page; and a message switch module configured to in response to detecting that the interaction gesture corresponds to an exit from the second page, switch from the second page to the first page.

In some embodiments, the message switch module comprising a click-or-slide-based switch module configured to in response to detecting that the interaction gesture comprises a non-tap gesture of a further predetermined type or a tap gesture to an exit icon on the second page, switch from the second page to the first page.

In some embodiments, the further predetermined type is different from a type of the non-tap gesture for switching from the first page to the second page.

In some embodiments, the non-tap gesture of the further predetermined type comprises a non-tap gesture detected in a predetermined area of the second page.

In some embodiments, the apparatus 1000 further comprises: a mask overlay module configured to in response to determining that the second page is presented for a first time, overlay a guide mask layer on the second page; and a guide presentation module configured to present exit guide information on the guide mask layer, the exit guide information indicating an interaction gesture for exiting from the second page.

In some embodiments, the predetermined icon comprises a non-login icon. In some embodiments, the icon presentation module comprises: a login determination module configured to determine whether a user is logged-in; and a login-based icon presentation module configured to in response to determining that the user is logged-in, present the non-login icon at the predetermined location in the first page.

In some embodiments, the apparatus 1000 further comprises: a login icon presentation module configured to in response to determining that no user is logged-in, present a login icon at the predetermined location in the first page; a login selection determination module configured to in response to detecting the non-tap gesture on the first page, determine whether the non-tap gesture corresponds to a selection of the login icon, based on a type of the non-tap gesture and a corresponding location of the first page in the page navigation structure; and a login switch module configured to in response to determining that the non-tap gesture corresponds to the selection of the login icon, switch from the first page to a login page.

In some embodiments, the prompt presentation module includes a pop-up window presentation module configured to present a message prompt pop-up window on the first page.

In some embodiments, the predetermined icon comprises a message icon corresponding to a message page. In some embodiments, the apparatus 1000 further comprises: a first session page switch module configured to in response to detecting a selection of a message prompt pop-up window, switch from the first page to a message session page corresponding to a message; and a first session quit module configured to in response to detecting an interaction gesture indicating an exit from the message session page, switch from the message session page to the message page.

In some embodiments, the apparatus 1000 further comprises: a second session page switch module configured to in response to detecting that a selection of a message prompt pop-up window is detected in a page in addition to the application, switch from a page to a message session page corresponding to a message; and a second session exit module configured to in response to detecting an interaction gesture indicating an exit from the message session page, switch from the message session page to the message page.

Figure 11:
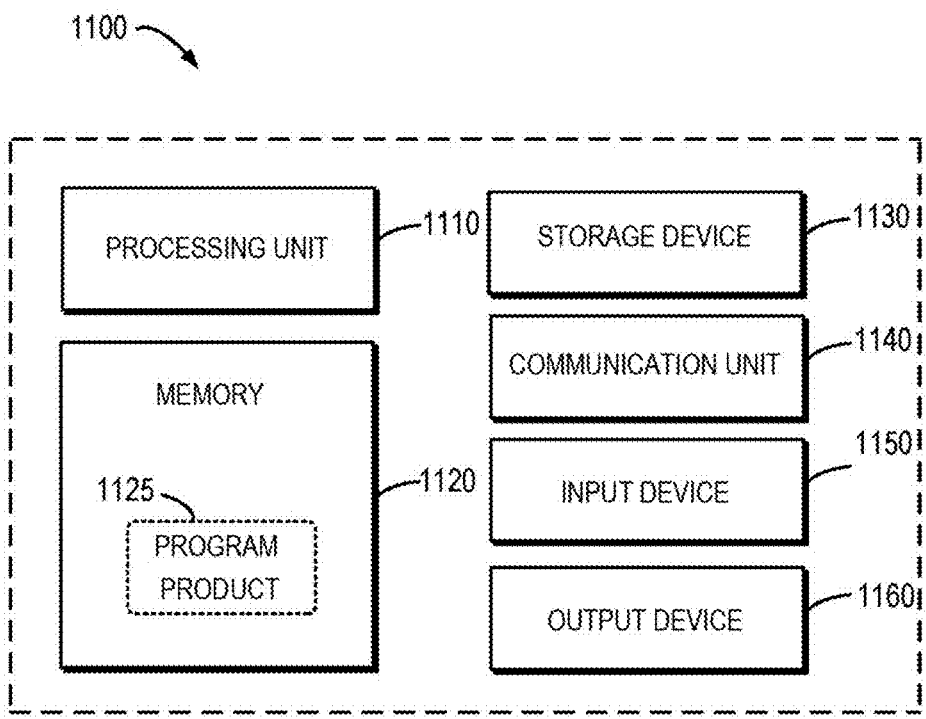
FIG. 11 shows a block diagram of a device capable of implementing various embodiments of the present disclosure.

FIG. 11 shows a block diagram of a computing device 1100 in which one or more embodiments of the present disclosure may be implemented. It would be appreciated that the computing device 1100 shown in FIG. 11 is only an example and should not constitute any restriction on the function and scope of the embodiments described herein. The computing device 1100 shown in FIG. 11 may be used to implement the terminal device 110 of FIG. 1.

As shown in FIG. 11, the computing device 1100 is in the form of a general computing device. The components of the computing device 1100 may comprise, but are not limited to, one or more processors or processing units 1110, memory 1120, storage 1130, one or more communication units 1140, one or more input devices 1150, and one or more output devices 1160. The processing unit 1110 may be actual or virtual processors and can execute various processes according to the programs stored in the memory 1120. In a multiprocessor system, multiple processing units execute computer executable instructions in parallel to improve the parallel processing capabilities of the computing device 1100.

The computing device 1100 typically comprises a variety of computer storage media. Such media may be any available media that is accessible to the computing device 1100, comprises but not limited to, volatile and non-volatile media, removable and non-removable media. The memory 1120 may be volatile memory (such as registers, cache, random access memory (RAM)), non-volatile memory (such as, a read-only memory (ROM), an electrically erasable programmable read-only memory (EEPROM), a flash memory), or some combination thereof. The storage device 1130 may be any removable or non-removable medium, and can comprise a machine-readable medium, such as a flash driver, a disk, or any other medium which can be used to store information and/or data (for example, training data for training) and can be accessed within the computing device 1100.

The computing device 1100 may further comprise additional removable/non-removable, volatile/non-volatile storage medium. Although not shown in FIG. 11, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 1120 can comprise a computer program product 1125, which comprises one or more program modules configured to execute various methods or actions of the various embodiments of the present disclosure.

The communication unit 1140 implements communications with other electronic devices via a communications medium. In addition, functions of components in the computing device 1100 may be implemented by a single computing cluster or multiple computing machines, which can communicate through a communication connection. Therefore, the computing device 1100 may be operated in a networking environment using a logical connection to one or more other servers, a network personal computer (PC), or another network node.

The input device 1150 may be one or more input devices, such as a mouse, a keyboard, a trackball, etc. The output device 1160 may be one or more output devices, such as a display, a speaker, a printer, etc. The computing device 1100 may also communicate with one or more external devices (not shown) through the communication unit 1140, as required. The external device, such as a storage device, a display device, etc., communicate with one or more devices that enable users to interact with the computing device 1100, or communicate with any device (for example, a network card, a modem, etc.) that makes the computing device 1100 communicate with one or more other computing devices. Such communication may be executed via an input/output (I/O) interface (not shown).

According to example implementation of the present disclosure, there is provided a computer-readable storage medium on which a computer-executable instruction or computer program is stored, wherein the computer-executable instructions are executed by a processor to implement the methods described above.

Various aspects of the present disclosure are described herein with reference to the flow chart and/or the block diagram of the method, the device, the apparatus, and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers, or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions comprises a product, which comprises instructions operable to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices are operable to implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment, or instructions, which includes one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description provides a number of examples, not exhaustive, and is not limited to the disclosed implementations. Without departing from the scope and spirit of the described implementations, many modifications and changes are obvious to ordinary skill in the art. The selection of terms used in this article aims to best explain the principles, practical application, or improvement of technology in the market of each implementation, or to enable others of ordinary skill in the art to understand the various embodiments disclosed herein.

What is claimed is:

1. A method of page interaction, comprising:
   presenting a predetermined icon at a predetermined position in a first page, the predetermined icon being configured to access a second page;
   detecting a non-tap gesture on the first page;
   in response to the non-tap gesture being detected, in accordance with the first page being located by a first target navigation label in a first level and a second target navigation label in a second level of a page navigation structure, determining whether the non-tap gesture is a non-tap gesture of a predetermined type;
   in accordance with the non-tap gesture being the non-tap gesture of the predetermined type, determining that the non-tap gesture corresponds to a selection of the predetermined icon; and
   in response to the non-tap gesture corresponding to the selection of the predetermined icon, switching from the first page to the second page.

2. The method of claim 1, wherein the second level comprises a plurality of navigation labels arranged in parallel in a row, the second target navigation label being at a rightmost location or a leftmost location among the plurality of navigation labels.

3. The method of claim 1, wherein the non-tap gesture of the predetermined type comprises a swipe-right gesture or a swipe-left gesture.

4. The method of claim 1, wherein the first target navigation label is used to locate a set of pages corresponding to a homepage, the set of pages comprising at least the first page, and
   wherein respective pages of the set of pages are further located by respective navigation labels in the second level.

5. The method of claim 1, wherein switching from the first page to the second page comprises:
   causing a content container corresponding to the first level to slide from the first page to the second page to accommodate content of the second page; and
   presenting the content accommodated in the content container.

6. The method of claim 2, wherein the first level comprises at least one of the following navigation labels: a navigation label corresponding to a homepage, a navigation label corresponding to a shopping page, and a navigation label corresponding to a friend content page; and
   wherein the second level comprises at least one of the following navigation labels: a navigation label corresponding to a recommended content page, a navigation label corresponding to the friend content page, a navigation label corresponding to a concerned content page, and a navigation label corresponding to the content page in a predetermined area.

7. The method of claim 1, wherein the predetermined location comprises an upper left location, an upper right location, a lower left location, or a lower right location of the first page.

8. The method of claim 1, wherein the predetermined icon comprises a message icon corresponding to a message page, the method further comprising:
- detecting a message; and
- in response to the message being detected, presenting a message prompt on the first page.

9. The method of claim 8, wherein presenting the message prompt comprises:
- in response to determining that the message is a friend message of a logged-in user, deforming the message icon into a first message prompt marker; and
- in response to determining that the message is a non-friend message, presenting a second message prompt marker in association with the message icon.

10. The method of claim 9, wherein the first message prompt marker is associated with a user who sent the friend message.

11. The method of claim 1, further comprising:
- detecting an interaction gesture on the second page; and
- in response to detecting that the interaction gesture corresponds to an exit from the second page, switching from the second page to the first page.

12. The method of claim 11, wherein switching from the second page to the first page comprises:
- in response to detecting that the interaction gesture comprises a non-tap gesture of a further predetermined type or a tap gesture to an exit icon on the second page, switching from the second page to the first page.

13. The method of claim 12, wherein the further predetermined type is different from a type of the non-tap gesture for switching from the first page to the second page.

14. The method of claim 12, wherein the non-tap gesture of the further predetermined type comprises a non-tap gesture detected in a predetermined area of the second page.

15. The method of claim 11, further comprising:
- in response to determining that the second page is presented for a first time, presenting a guide mask layer overlaid on the second page; and
- presenting exit guide information on the guide mask layer, the exit guide information indicating an interaction gesture for exiting from the second page.

16. The method of claim 1, wherein the predetermined icon comprises a non-login icon, and wherein presenting the predetermined icon at the predetermined location in the first page comprises:
- determining whether a user is logged-in; and
- in response to determining that the user is logged-in, presenting the non-login icon at the predetermined location in the first page.

17. The method of claim 16, further comprising:
- in response to determining that no user is logged-in, presenting a login icon at the predetermined location in the first page;
- in response to detecting the non-tap gesture on the first page, determining whether the non-tap gesture corresponds to a selection of the login icon, based on a type of the non-tap gesture and a corresponding location of the first page in the page navigation structure; and
- in response to determining that the non-tap gesture corresponds to the selection of the login icon, switching from the first page to a login page.

18. An electronic device, comprising:
- at least one processing unit; and
- at least one memory coupled to the at least one processing unit and storing instructions for execution by the at least one processing unit, the instructions, when executed by the at least one processing unit, causing the device to perform acts comprising:
  - presenting a predetermined icon at a predetermined position in a first page, the predetermined icon being configured to access a second page;
  - detecting a non-tap gesture on the first page;
  - in response to the non-tap gesture being detected, in accordance with the first page being located by a first target navigation label in a first level and a second target navigation label in a second level of a page navigation structure, determining whether the non-tap gesture is a non-tap gesture of a predetermined type;
  - in accordance with the non-tap gesture being the non-tap gesture of the predetermined type, determining that the non-tap gesture corresponds to a selection of the predetermined icon; and
  - in response to the non-tap gesture corresponding to the selection of the predetermined icon, switching from the first page to the second page.

19. A non-transitory computer readable storage medium, having a computer program stored thereon which, when executed by a processor, implements acts comprising:
- presenting a predetermined icon at a predetermined position in a first page, the predetermined icon being configured to access a second page;
- detecting a non-tap gesture on the first page;
- in response to the non-tap gesture being detected, in accordance with the first page being located by a first target navigation label in a first level and a second target navigation label in a second level of a page navigation structure, determining whether the non-tap gesture is a non-tap gesture of a predetermined type;
- in accordance with the non-tap gesture being the non-tap gesture of the predetermined type, determining that the non-tap gesture corresponds to a selection of the predetermined icon; and
- in response to the non-tap gesture corresponding to the selection of the predetermined icon, switching from the first page to the second page.

* * * * *